United States Patent [19]

Haynes

[11] Patent Number: 5,222,461
[45] Date of Patent: Jun. 29, 1993

[54] ANIMAL ACTIVATED FEEDER

[76] Inventor: Graham J. Haynes, Unit 2, 65 Blyth Street, Parkside, South Australia 5063, Australia

[21] Appl. No.: 847,988
[22] PCT Filed: Aug. 12, 1991
[86] PCT No.: PCT/AU91/00354
   § 371 Date: Apr. 15, 1992
   § 102(e) Date: Apr. 15, 1992
[87] PCT Pub. No.: WO92/03042
   PCT Pub. Date: Mar. 5, 1992

[30] Foreign Application Priority Data

Aug. 17, 1990 [AU] Australia .................. PK1827

[51] Int. Cl.$^5$ ................................ A01K 5/02
[52] U.S. Cl. ...................... 119/62; 119/51.12; 119/55
[58] Field of Search ........... 119/62, 51.12, 54, 55, 119/57, 61

[56] References Cited

U.S. PATENT DOCUMENTS

| 3,826,231 | 7/1974 | Crawford et al. | 119/51.12 |
| 4,249,483 | 2/1981 | Sobky | 119/51.12 |
| 4,805,560 | 2/1989 | Knego et al. | 119/51.12 |

FOREIGN PATENT DOCUMENTS

| 2498889 | 8/1982 | France | 119/51.12 |
| 2574622 | 6/1986 | France | 119/51.12 |

*Primary Examiner*—John G. Weiss
*Attorney, Agent, or Firm*—Klauber & Jackson

[57] ABSTRACT

An animal activated feeder (10) has a base (11) which supports a central cradle (17) for rotation about a central axis. A circular food bowl (40) having a number of receptacles (41) can be positioned on the cradle (17) to rotate with it, or lifted off for cleaning. The base (11) includes a central spring housing (13) having a flat helical torsion spring (14) ("clock spring") which causes rotation of the cradle (17) and therefore the food bowl (40), but rotation is indexed in increments by a pet activated foot pedal (29) which is pivoted to the base and has a finger (28) lying in the path of travel of lugs (25) of a first group which project from the cradle (17). Indexing is limited to feed one receptacle (41) at a time, preventing spinning of the food bowl, by a second group of lugs (24) projecting from the cradle and when the foot pedal (29) is depressed, the finger (28) moves from the path of travel of the first group of lugs (25) and into the path of travel of the lugs (24) of the second group.

9 Claims, 3 Drawing Sheets

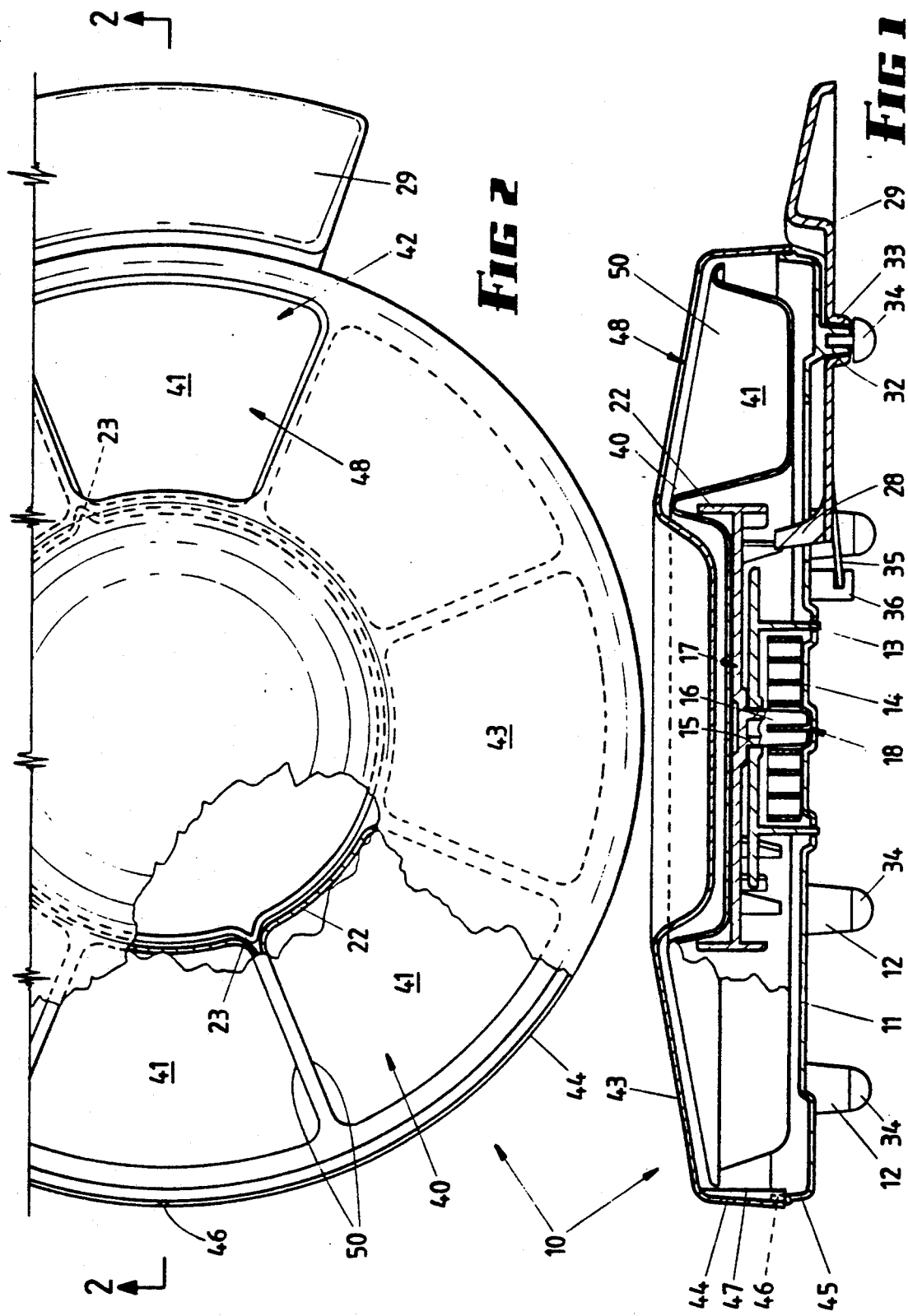

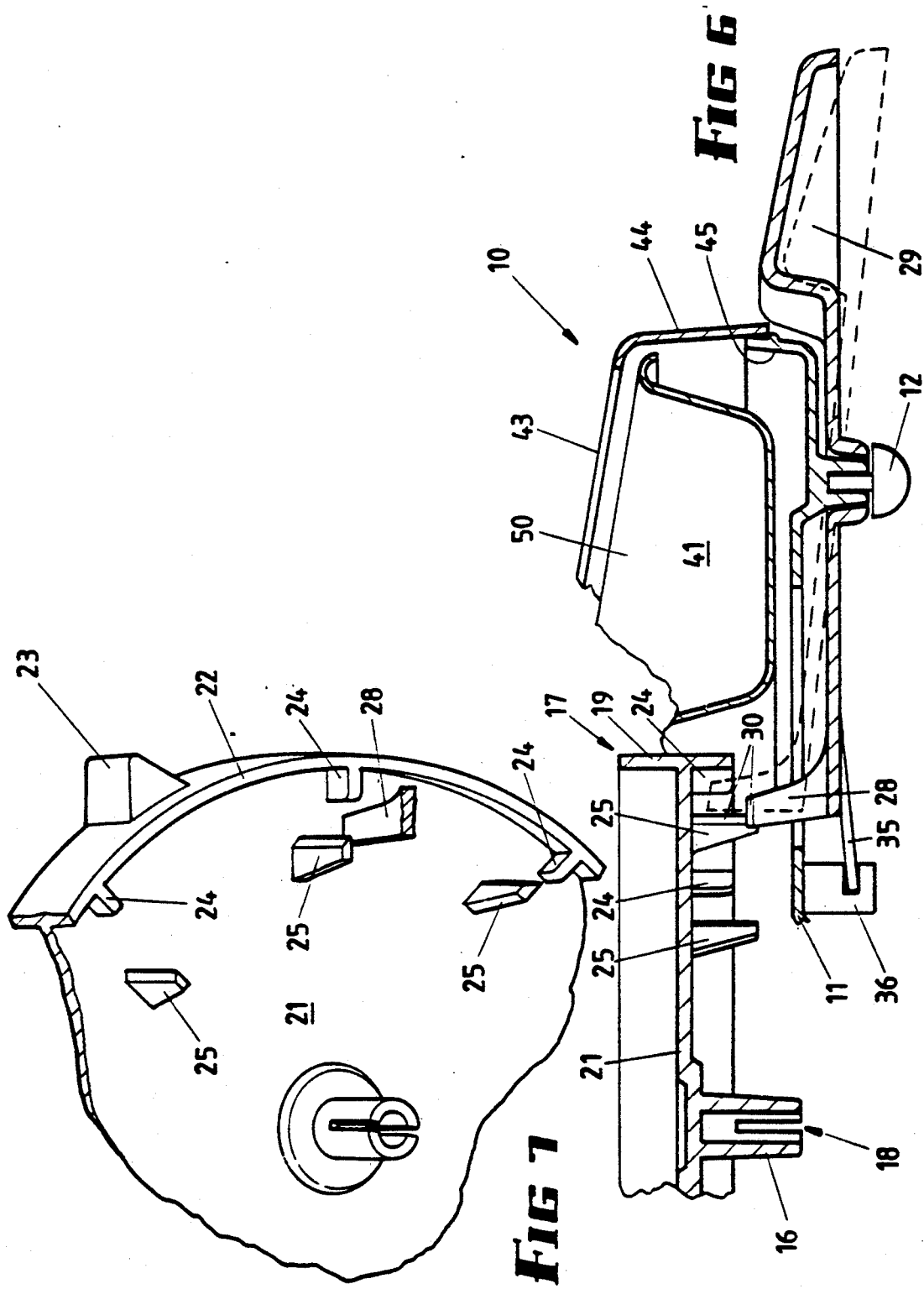

ANIMAL ACTIVATED FEEDER

This invention relates to an animal activated feeder of the type generally described in our Australian Petty Patent No. 592292 entitled "IMPROVEMENTS RELATING TO PET FEEDERS" for which application was made on Jan. 11, 1989.

BACKGROUND OF THE INVENTION

In that Petty Patent, there was described and illustrated an animal feeder which comprised a food holder having a plurality of depressions located in spaced apart arrangement around a periphery of the holder providing thereby a plurality of compartments for holding of food, cover means to restrict access to all but one of the compartments by the animal at any one time and trigger means including a trigger plate extending outwardly of the cover means and the holder accessible by an animal whereby depression of the trigger plate effected a change of access for the animal from the first of the compartments to the further of the compartments, by movement of the food holder relative to the cover. The energy required to effect movement of the food holder was supplied by a flat helical spring ("clock spring") which was wound up every time the food holder was replenished. The trigger means included an escapement mechanism comprising a trigger plate extending radially from a body supporting the food holder and located adjacent the accessible location through the cover, so that when an animal such as a cat approached the food holder, by stepping on the trigger plate, the food holder was caused to rotate through one of a plurality of indexed movements. The trigger plate had an inwardly directed finger thereon which was releasably engaged by each of a plurality of circumferentially spaced radially projecting lugs, but upon depression for example by a cat, the finger was drawn outwardly to a position clear of the edge of a lug to allow that lug to move forwardly for an index movement.

The arrangement described above functioned satisfactorily in many respects, but had some inherent problems which it is the object of this invention to overcome.

Firstly, with the arrangement the subject of the Petty Patent, it was necessary to remove the actuating spring along with the food bowl if the food bowl was required to be cleaned by immersion in sudsy water, which would otherwise cause the spring to rust and possibly malfunction. It is not always convenient to so remove the spring actuating mechanism, since the ends of the spring need to be reinserted in the respective receptacles. The main object of this invention therefore is to provide an improvement whereby the spring actuating mechanism is retained to the base of a feeder when the food bowl is removed.

BRIEF SUMMARY OF THE INVENTION

An animal activated feeder has a base which supports a central cradle for rotation about a central axis. A circular food bowl having a number of receptacles can be positioned on the cradle to rotate with it, or lifted off for cleaning. The base includes a central spring housing having a flat helical torsion spring ("clock spring") which causes rotation of the cradle, and therefore the food bowl, but rotation is indexed in increments by a pet activated foot pedal which is pivoted to the base and has a finger lying in the path of travel of lugs of a first group which project from the cradle. Indexing is limited to feed one receptacle at a time, preventing spinning of the food bowl, by a second group of lugs projecting from the cradle and when the foot pedal is depressed, the finger moves from the path of travel of the first group of lugs and into the path of travel of the lugs of the second group.

While the actuating mechanism described and illustrated in the said Petty Patent can be made to work satisfactorily, it was still prone to occasional malfunction, and another object of the invention is to provide simple design improvements wherein such malfunction is less likely to occur.

BRIEF SUMMARY OF THE DRAWINGS

An embodiment of the invention is described hereunder in some detail with reference to and is illustrated in the accompanying drawings in which:

FIG. 1 is a fragmentary top view of an animal activated feeder, partly cutaway to show the food bowl engaging the cradle, FIG. 2 is an elevational section taken on line 2—2 of FIG. 1, FIG. 6 is a fragmentary section drawn to a larger scale than FIG. 2 and illustrating the manner in which the foot pedal can move the finger from the path of travel of a radially inner group of lugs to a radially outer group of lugs on the cradle, and FIG. 7 is a fragmentary underside perspective view of FIG. 6 which shows the scope of mechanism for the cradle in three dimensions. FIG. 7 approximates a first angle projection of FIG. 6 except for the perspective component.

DETAILED DESCRIPTION OF THE PREFERRED EMBODIMENT

Figure 3:
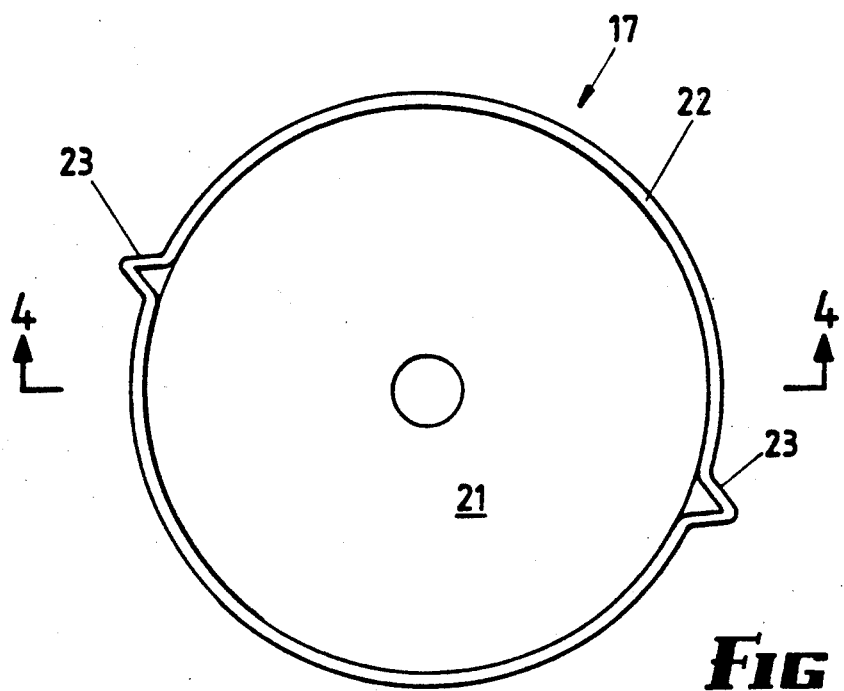
FIG. 3 is a top view of the cradle.

In the drawings an animal activated feeder 10 comprises a base 11 which is supported by rubber base feet 12, and has staked to it a spring housing 13 which thereby becomes portion of the base, the spring housing 13 housing a flat helical torsion spring 14 the outer end of which is coupled to the housing 13 by extending through a slot therein (not shown). The housing 13 is provided with a central bearing surface 15 in which is journalled a spigot 16 of a cradle 17, the lower end of the spigot 16 being bifurcated by a slot 18 which receives the inner end of the flat helical spring 14 so that the spring co-acts between the spring housing 13 (and thereby the base 11) on the one hand and the cradle 17.

Figure 4:
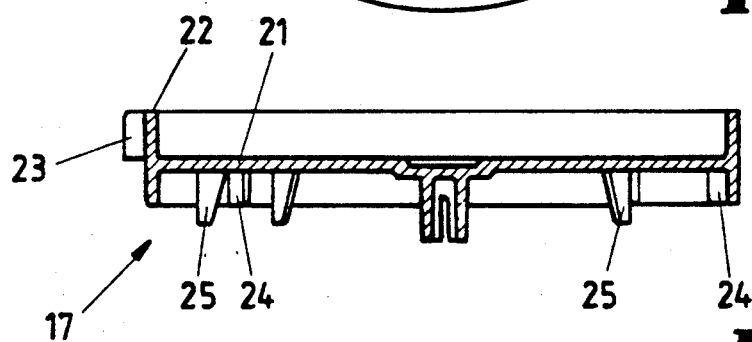
FIG. 4 is a section taken on line 4—4 of FIG. 3.
Figure 5:
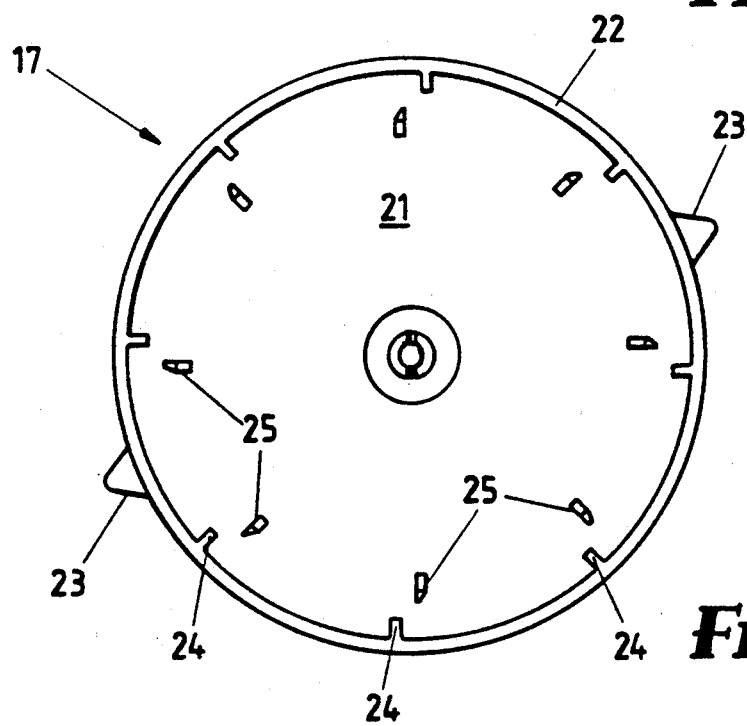
FIG. 5 is a bottom view of FIG. 4.

As best seen in FIGS. 3, 4 and 5, the cradle 17 comprises central discoid portion 21 surrounded by a flange 22, the upper portion of the flange 22 having radially outwardly extending projections 23 diametrically opposite each other, while the underneath portion of the flange 22 has an outer group lugs 24, and these are spaced both circumferentially and radially away from another group of lugs 25. The lugs are spaced equally around their respective pitch circles, and there is sufficient difference in the diameters of those pitch circles that a finger 28 on an end of a foot pedal 29 can intercept the path of travel of the inner group of lugs 25, or alternately of the outer group of lugs 24. While the relative positions are not critical, it will be seen that the lugs are spaced closely together in pairs so that if, for example, a cat were to stand on the foot pedal 29, the cradle 21 would index by almost one complete sequence, indexing then being stopped by the outer lugs 24 until the cat removed itself from the foot pedal whereupon the final stage of indexing would be achieved when the finger 28 would be abutted by a lug 25 of the same pair. The finger and the tip ends of the lugs 25 are chamfered at 30 in one direction only, and that is the direction of winding up the spring 14 to strain it, the chamfer being sufficient to deflect the finger 28.

The base 11 is provided with a depending boss 32 which loosely contains a hollow projection 33 of the foot pedal 29 to provide pivot means therefor, and assembly is maintained by a resilient foot member 34. A pair of leaf springs 35 extend between respective depending anchors 36 which project downwardly from the base 11, and the foot pedal 29 to provide a resilient return force to return the foot pedal to a position where the portion which is activated by an animal is raised, and therefore the finger 29 is lowered to encounter the lugs 25 of the inner group. When however the animal applies pressure to the outwardly projection portion of the foot pedal 29, the finger 28 moves away from the path of travel of the inner group of lugs into the path of travel of the outer group of lugs as best seen in FIG. 6.

A food bowl 40 comprises a moulding which defines eight circumferentially spaced food receptacles 41 all of which are upwardly open, and are so positioned with respect to the indexing lugs 25 as to be successively indexed to a feeding station 42 adjacent the pedal 29. There is also provided a cover 43 which has a down-turned flange 44 and the down-turned flange 44 is supported by a rib on an upturned flange 45 of the base 11, the upturned flange 45 containing a slot 46 (FIG. 2) which accommodates a projecting web 47 on the cover 43, thereby retaining the cover in position with an opening 48 therein located above the receptacle 41 but only at the feed position, that is adjacent the foot pedal 29.

Between the receptacles 41 of the food bowl 40, there are dividing walls 50 and these define recesses which receive the projections 23 of the cradle, the arrangement being such that the food bowl 40 can be simply positioned on the cradle 17 and be supported by the upper part of flange 22, being retained against relative rotation by the projections 23, but for cleaning purposes can be simply lifted off the cradle.

In use, the cover is simply lifted away from the food bowl and food is placed in the various receptacles. The food bowl is rotated taking with it the cradle which strains the spring to provide the necessary motive force for return rotation, and when this occurs the chamfers on the lugs 25 deflect the foot pedal 29 simplifying "winding up" of the spring. The cover is then replaced and the animal will activate the foot pedal as required. It is surprisingly easy to train an animal in that function. Either the inner group of lugs 25 or the outer group of lugs 24 will arrest rotation of the feed bowl depending on whether the foot pedal 29 is immediately released or is maintained depressed.

With this invention, cleaning of the food bowl is simplified merely lifting it away from the cradle, and the spring is housed in the spring housing 13 and protected against loss or damage by the walls of the base and the spring housing. The arrangement of the lugs and the foot pedal as illustrated has been found to function with much reliability, and occasional malfunction has been substantially avoided.

I claim:

1. An animal activated feeder comprising a base, a cradle centrally mounted on the base for relative rotation about a vertical axis, a torsion imparting spring co-acting between the cradle and the base urging said cradle rotation in a first direction, a group of circumferentially spaced indexing lugs projecting from the cradle,
    an actuating pedal projecting from the base and pivoted with respect thereto, return means urging the pedal to an elevated position, a finger on the pedal engageable by respective said lugs successively when the pedal repeatedly moves to its elevated position to thereby inhibit said rotation but being releasable from each lug in turn upon repeated depression of the pedal to permit indexing of the cradle by said rotation in a first direction,
    a food bowl carried by the cradle for rotation therewith but removable therefrom, the food bowl comprising a plurality of circumferentially spaced receptacles which are upwardly open, and so positioned with respect to the indexing lugs as to be successively indexed to a feeding station adjacent the pedal upon repeated depression of the pedal,
    and a cover carried by the base having an opening above the feeding station providing access to the food bowl receptacle which, for the time being, is at the feeding station, but covering all other said receptacles.

2. An animal activated feeder according to claim 1 wherein said base comprises a central spring housing which houses said torsion spring, said spring housing also having a central bearing surface,
    said cradle having a depending spigot which rotationally engages said bearing surface for said relative rotation, the lower end of said spigot being bifurcated by an upwardly extending slot,
    said torsion imparting spring being a flat helical spring having an inner end contained in said slot and an outer end engaging the spring housing.

3. An animal activated feeder according to claim 2 wherein said spring housing comprises projections staked to said base.

4. An animal activated feeder according to any one of claims 1 to 3 wherein said food bowl comprises walls which separate said receptacles and have surfaces which define recesses therebetween, and said cradle has at least one projection which is contained between the recess surfaces when the bowl is carried by the cradle and thereby inhibits relative rotation therebetween but does not inhibit removal of the bowl from the cradle in an axial direction.

5. An animal activated feeder according to claim 1 wherein said lugs extend downwardly from a surface of the cradle and are arranged on a relatively smaller pitch circle concentric with said vertical axis, and further comprising a second group of lugs also extending downwardly from said cradle surface and arranged on a relatively larger pitch circle,
    said finger lying in the path of travel of the lugs of the first said group only when the pedal is in its elevated position and in the path of travel of the lugs of the second said group only when the pedal is depressed, so as to permit said indexing by one receptacle only for each depression of the pedal.

6. An animal activated feeder according to claim 5 wherein each of said indexing lugs on the relatively smaller pitch circle comprises a surface with sufficient chamfer to deflect said finger upon rotation of the cradle in a second direction, thereby enabling said spring to be strained.

7. An animal activated feeder according to claim 1 wherein said pedal is pivoted by means of a pivotal mount depending from a surface of the base, an aperture intermediate the ends of the pedal defined by surfaces which loosely engage the pivotal mount, and a resilient member retaining the pedal to the pivotal mount.

8. An animal activated feeder according to claim 7 wherein said return means comprise resilient leaf springs co-acting between the pedal and the base.

9. An animal activated feeder according to claim 1 wherein the base comprises an upturned peripheral flange and the cover a down-turned peripheral flange carried thereby, and further comprising a locating projection on one of those said flanges engaging surfaces of a notch in the other of those said flanges.

* * * * *